Dec. 8, 1931.     H. W. FAUNCE     1,835,479
MOVING PICTURE FILM HOLDING DEVICE
Filed Dec. 23, 1929
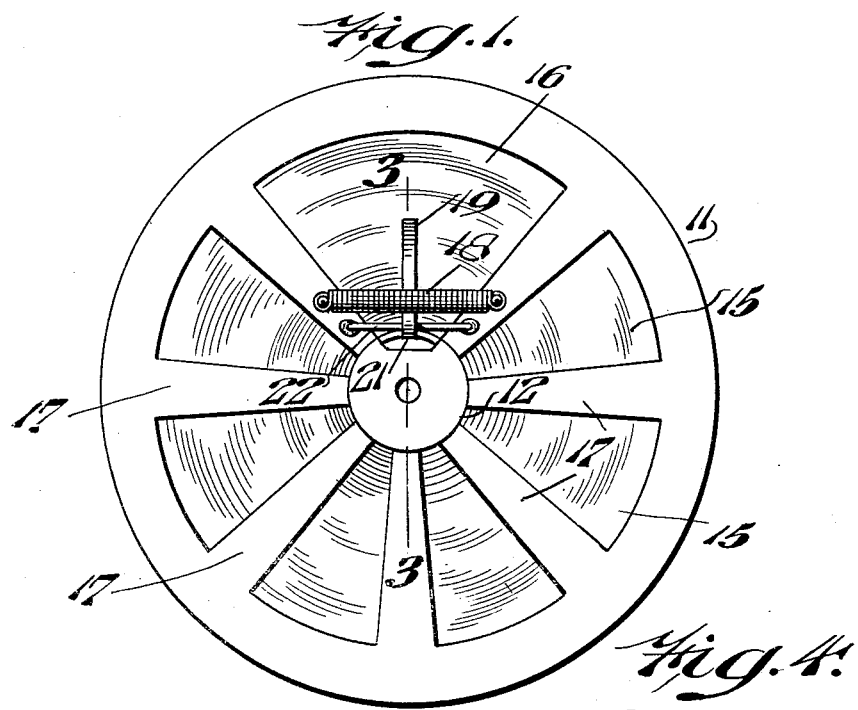
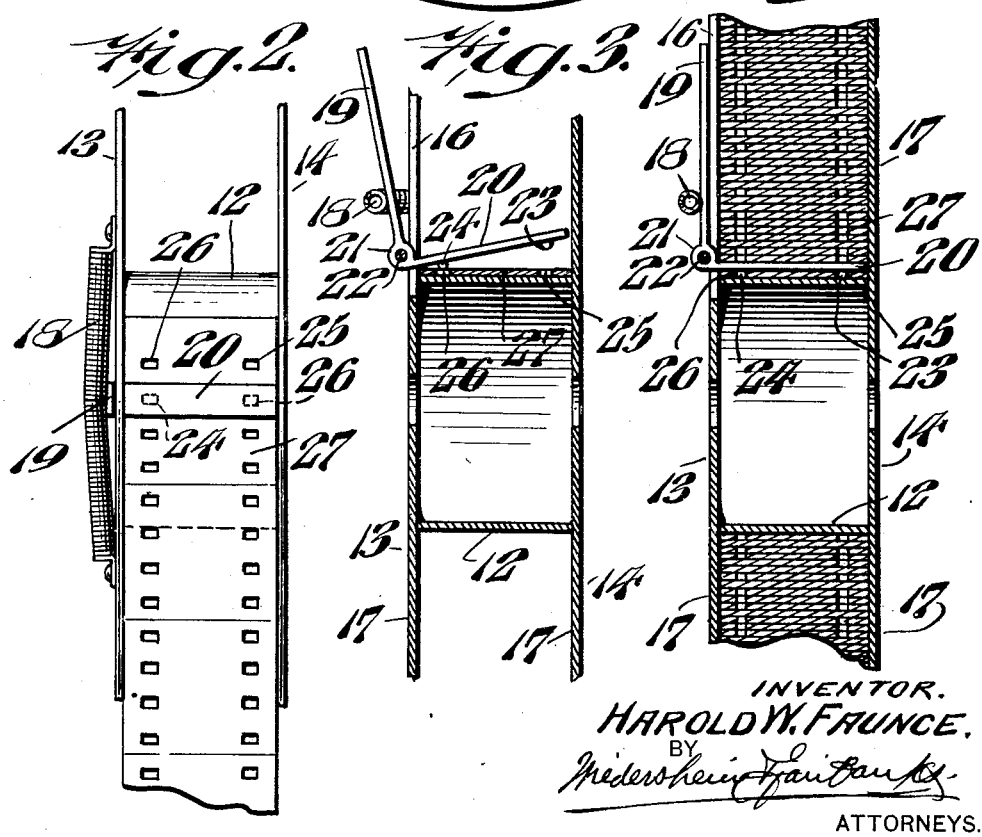
INVENTOR.
HAROLD W. FAUNCE,
BY
ATTORNEYS.

Patented Dec. 8, 1931

1,835,479

UNITED STATES PATENT OFFICE

HAROLD W. FAUNCE, OF ATLANTIC CITY, NEW JERSEY

MOVING PICTURE FILM HOLDING DEVICE

Application filed December 23, 1929. Serial No. 416,929.

This invention relates to a cinematograph film holding device having for its object the provision of a device of the kind indicated of comparatively simple inexpensive construction, and particularly designed and adapted to be applied to any conventional form of motion picture reel without reorganization thereof.

Another object of the invention is to provide an improved simplified device for holding cinematograph films by means constructed and adapted to perform its designated function, in the most convenient and efficient manner possible.

Other objects and advantages of the present embodiment of the invention will appear more fully in the details hereinafter set forth when taken in connection with the accompanying drawings in which:

Figure 1 is a plan elevational view of a motion picture reel to which my invention has been operatively applied;

Figure 2 is a fragmentary elevational view of a motion picture reel showing my invention applied thereto as viewed from above;

Figure 3 is a fragmentary sectional view taken on line 3—3 of Figure 1 showing my invention in position either of releasing the motion picture reel or to operatively engage same for fastening to the reel, and Figure 4 is a fragmentary sectional view similar to Figure 3, showing the device in operative position with the cinematograph film wound on the reel in its usual form.

While at the present time there are quite a number of devices for releasing and securing cinematograph films on their respective reels, practically all of these devices are of a complicated, expensive and cumbersome type, necessitating in general, reorganization either of the film-holding reel or at least necessitating the attachment of constructions which lend added complexity to structures which are already highly detailed and of a complicated nature. It is with a view of eliminating these undesirable attributes of present day film holding devices that the present invention has been devised.

Referring more particularly to the drawings, 11 designates a motion picture film reel of conventional pattern comprising a central spool or arbor 12 to which is secured the discs 13 and 14, having struck-out portions 15. As best shown in Figure 1 it will be seen that I have provided a comparatively larger struck-out portion 16 by eliminating one of the series of spokes 17 which are conventional in this type of structure.

My invention is applied to one of the discs, in the present case 14 by connecting the ends of the spring 18 to two of the series of spokes 17 by soldering, riveting or in any suitable desired manner. The spring 18 is resiliently engaged with an up-turned finger or operating lever 19 of an L-shaped latch 20 which is pivoted at 21 to a bar or pintle 22, the latter being soldered or otherwise suitably secured to the same pair of spokes 17 on which the spring 18 is fastened. As best shown in Figures 3 and 4 it will be seen that latch 20 is provided with lugs 23 and 24 which are received in the usual notches 25 and 26 formed in the conventional cinematograph film a specimen 27 of which is shown in the present embodiment.

As best illustrated in Figure 3, the end of the film 27 has been placed on the spool 12 preparatory to being engaged by lugs 23 and 24 of the latch 20, while in Figure 4 the latch 20 has been released, thus pressing the lugs 23 and 24 into the notches 25 and 26 of the film in position to hold same. After this has been done, the remainder of the film may be wound about the spool 12 in the usual manner. The release of the film from the spool 12 is of course indicated in Figure 3, this being accomplished by merely pressing back the operating lever 19 with the finger thus causing the lugs 23 and 24 to be raised from the perforations or notches 25 and 26 of the film. It will thus be seen that with the utmost simplicity of means and at a nominal cost I have provided an instrumentality for the securing and releasing cinematograph films from their co-acting reels by the structure illustrated and described, the only possible change in the construction on the reel itself, in the present form being the eliminating of one of the series of spokes 17. To some of the reels where the cut-out portions 15 are of the same extent as that indicated in the cut-out portion 16 my device can be immediately applied without any change whatever.

It will of course be understood that variations and changes may be made in the device without departing from the spirit or sacrificing any of the advantages of the invention; hence I do not limit myself to the precise details of construction but desire to avail myself of such embodiments and structures as fairly fall within the scope of the appended claim.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

Having thus described my invention, what I claim as new and desire to secure by Letters Patent, is:—

A film reel comprising a pair of discs and an intermediate spool on which the film may be wound, an arm carried by one of said discs, an L-shaped member pivoted on said arm and having the transverse limb thereof projecting through a hole in said disc immediately above said spool and the vertical limb thereof extending along the outer surface of said disc, a spring carried by said disc and adapted to urge said vertical limb against said disc, and lugs on said transverse limb adapted to engage said film.

HAROLD W. FAUNCE.